April 25, 1950  D. McD. SHEARER  2,505,152
METHOD OF MOLDING CONCRETE REVETMENT MAT UNITS
Filed Feb. 11, 1949  5 Sheets-Sheet 1
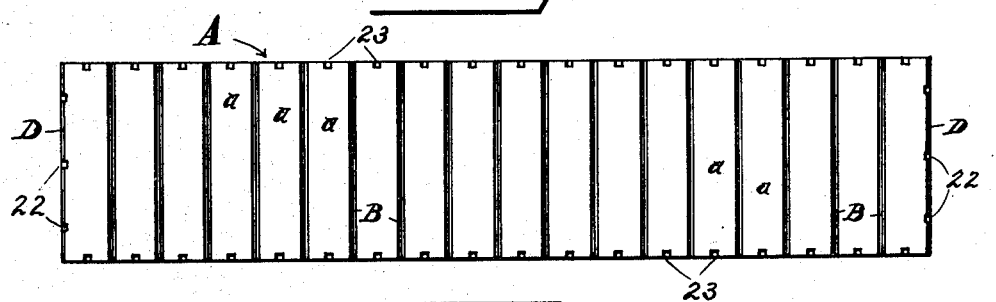
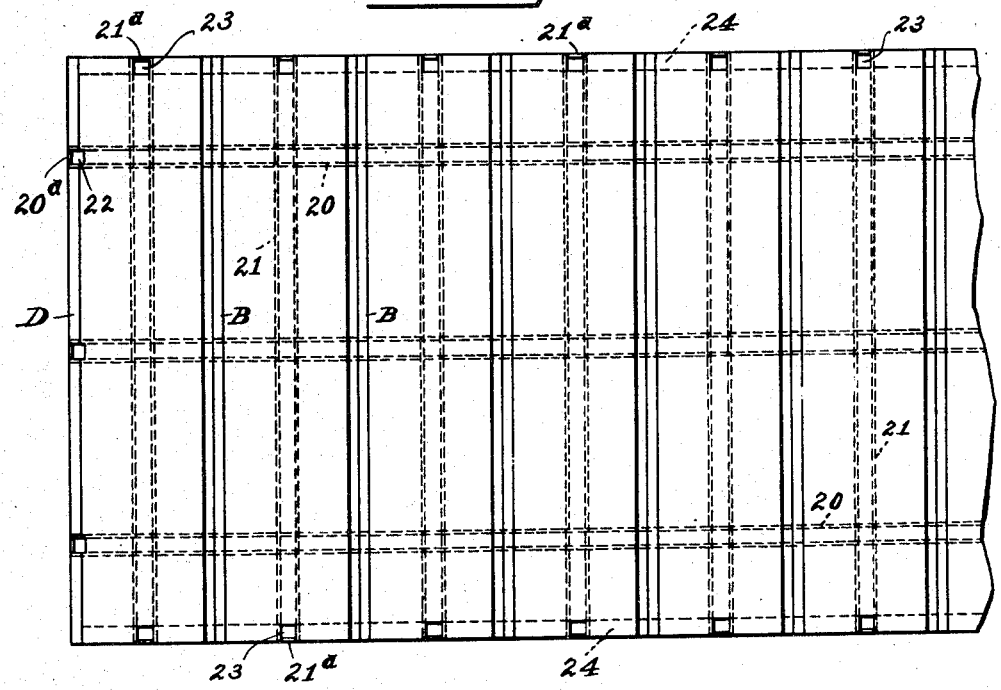

April 25, 1950 D. McD. SHEARER 2,505,152
METHOD OF MOLDING CONCRETE REVETMENT MAT UNITS
Filed Feb. 11, 1949 5 Sheets-Sheet 2

Inventor
David McD. Shearer
By Munn, Liddy, Slavcum & Rich
ATTORNEYS

April 25, 1950     D. McD. SHEARER     2,505,152
METHOD OF MOLDING CONCRETE REVETMENT MAT UNITS
Filed Feb. 11, 1949     5 Sheets-Sheet 3
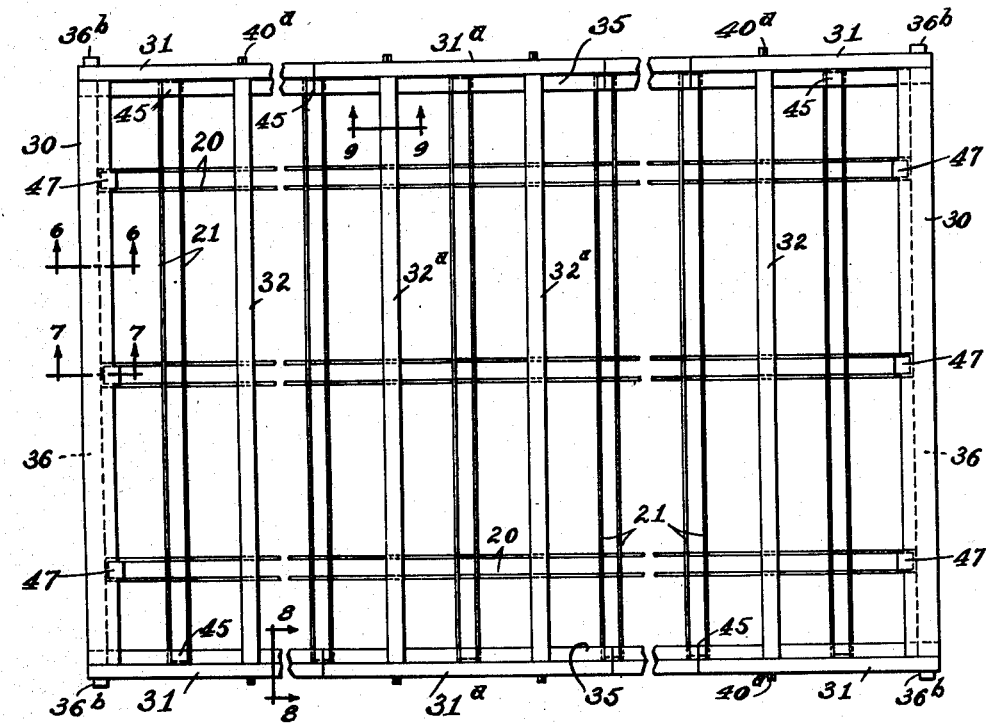
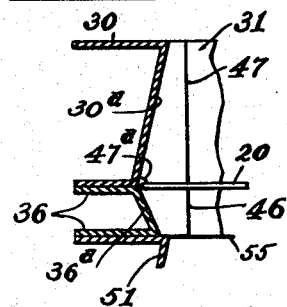
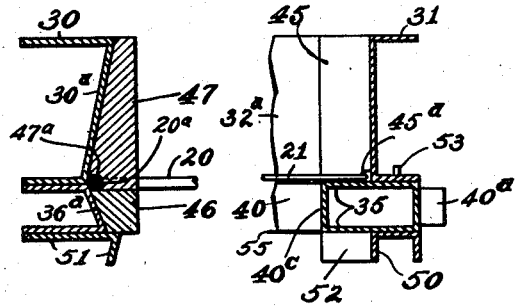
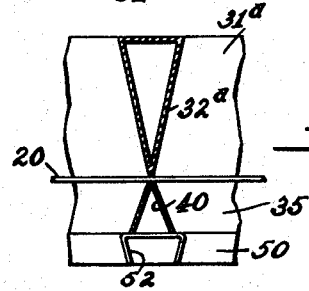

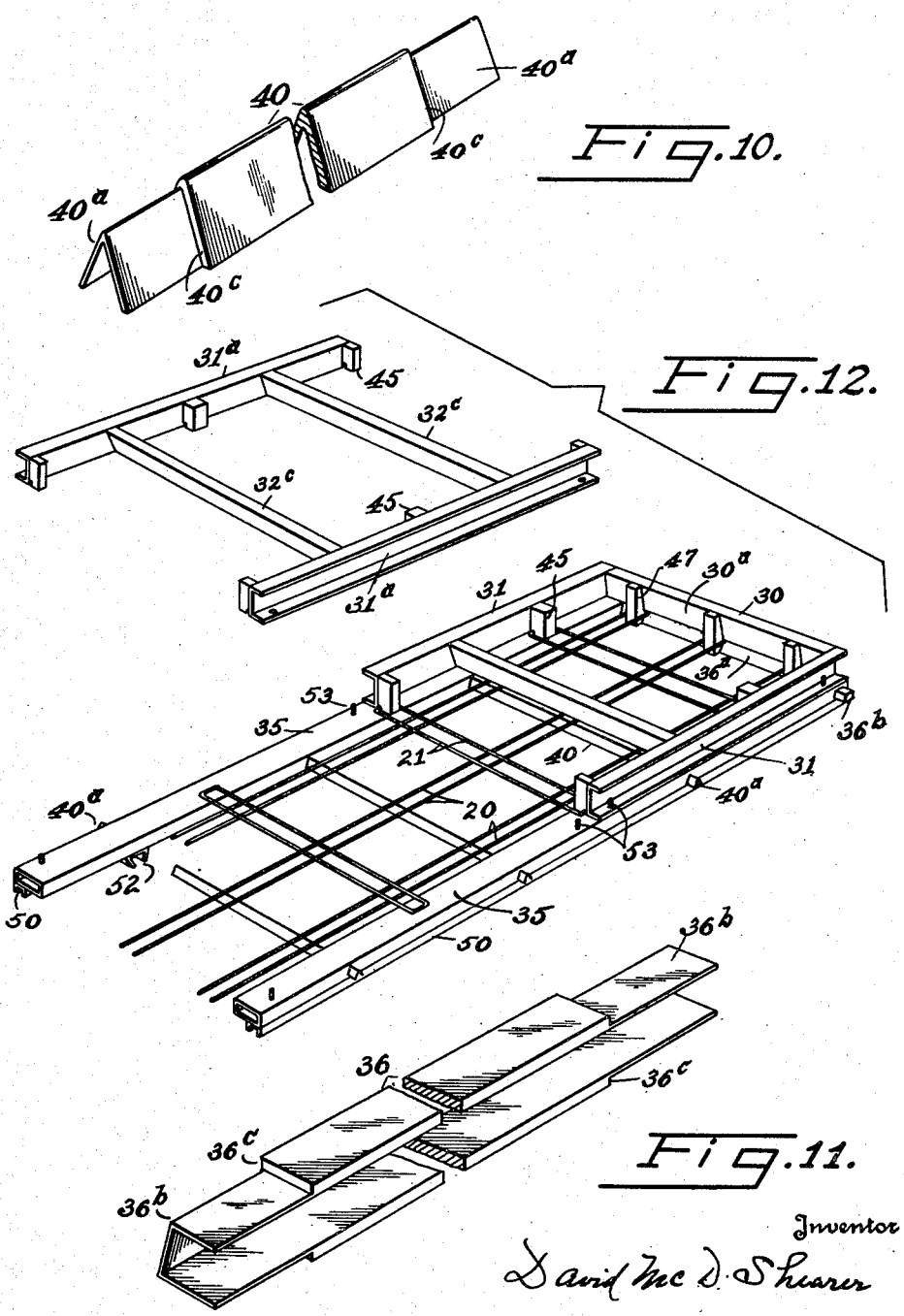

April 25, 1950   D. McD. SHEARER   2,505,152
METHOD OF MOLDING CONCRETE REVETMENT MAT UNITS
Filed Feb. 11, 1949   5 Sheets-Sheet 5

Inventor
David McD. Shearer
ATTORNEYS

Patented Apr. 25, 1950

2,505,152

UNITED STATES PATENT OFFICE 2,505,152

METHOD OF MOLDING CONCRETE REVETMENT MAT UNITS

David McD. Shearer, San Antonio, Tex.

Application February 11, 1949, Serial No. 75,768

4 Claims. (Cl. 25—154)

My invention embraces certain improvements in the method employed for insuring adequate separation during the molding process of a superposed revetment mat section on a similar previously molded section whereby a clean and ready withdrawal of the side piece and the cross pieces of the form, underlying the wire grid, can be effected without injury to either the parts of the form or to the casting in which they are embedded.

To this and other ends my invention comprises further improvements and advantages as will be further described in the accompanying specification, the novel features thereof being set forth in the appended claims.

In the drawings:

Figure 1 is a plan view showing a unit element of a revetment mat as completed in a form embodying my present invention.

Figure 2 is a similar view showing one end of the unit on an enlarged scale.

Figure 4:
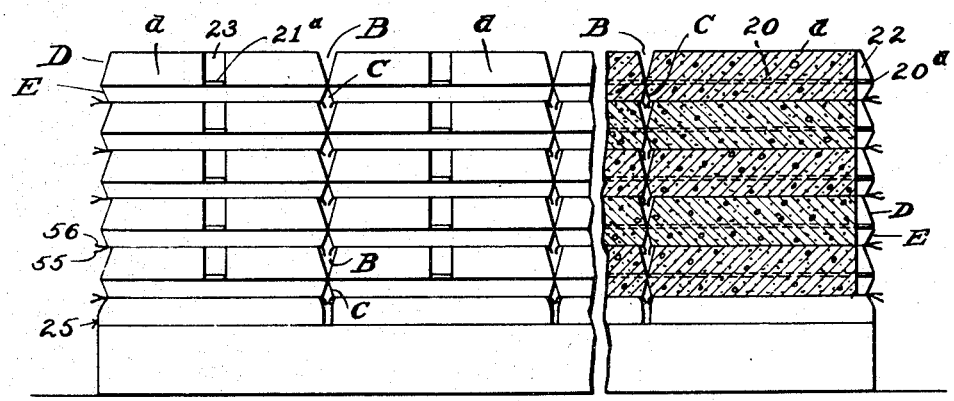
Figure 4 is a side view of the stacked or superposed units shown in Fig. 3, a portion thereof being also shown in section.

Figure 4ª is an enlarged fragmentary view of a portion of the superposed units shown in Fig. 4.

Figure 5 is a plan view of the mold form also showing the reinforcing wires of the unit laid therein preparatory to pouring the concrete.

Figure 6 is an enlarged vertical cross section taken on the line 6—6 of Fig. 5.

Figure 7 is an enlarged vertical cross section taken on the line 7—7 of Fig. 5.

Figure 8 is an enlarged vertical cross section taken on the line 8—8 of Fig. 5.

Figure 9 is an enlarged vertical cross section taken on the line 9—9 of Fig. 5.

Figure 10 is a perspective view of the removable cross piece of the nowel of the mold form.

Figure 11 is a perspective view of the removable end piece of the nowel of the mold form.

Figure 12 is a perspective view of one of the ends of the mold form, and

Figure 13:
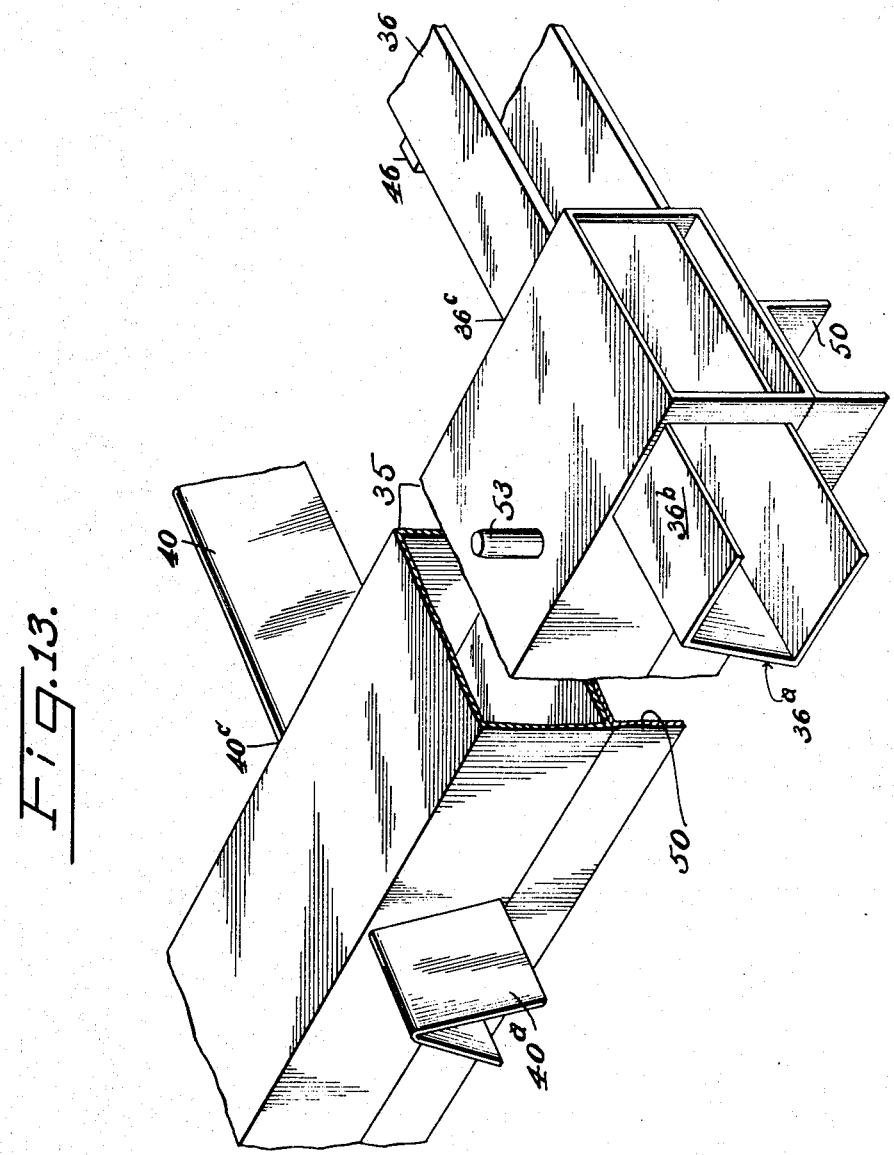

Figure 13 is a fragmentary perspective view showing the demountable portions of the nowel of the mold form.

Similar reference numerals, in the several figures, indicate similar parts.

The construction of articulated slab revetment mats as employed in the protection from erosion of submerged banks of large alluvial streams involves large scale engineering operations the success and efficiency of which depends upon the design characteristics and construction of the unit sections of which the mat structure is an assembly. Consequently the prefabricating of the units in quantities in an efficient economical manner is of primary importance and to this end I have devised certain improvements in a mold form by means of which the mat units of desired length, thickness, width, and closeness of texture may be reproduced with exact uniformity and in a manner that will facilitate their subsequent handling incident to the assembling of a mat structure and the final placement of the latter in a subaqueous position.

The structure of the mold form and present invention which it embodies will be more readily appreciated by a preliminary discussion of the product produced by it.

Generally stated so called articulated slab revetments employed for the protection of submerged banks of streams are extensive structures each necessarily composed of an assembly of a large number of unit sections, of a size suitable for handling, connected together both side by side and endwise. It is essential that these points of connection be effected in such a manner as to obviate the formation of openings through which water may flow to cause "leaching" or erosion which results in undermining the revetment in place. For the same reason it is also essential that the unit slabs of each section be flexibly interconnected side by side without spacing or interval between slabs.

The mat assembly or built up mat structure must possess the requisite flexibility as a whole to facilitate, in the first instance, its being launched over the curved side of a barge by means of launching cables and secondly to accommodate itself to the contour of a submerged bank. These factors call for characteristic features including flexibility lengthwise in the unit sections which I provide for in the molding operation.

Figure 1 shows a unit section A, although the size of the unit sections may vary in accordance with the fabricating plant and conditions in general, the preferred dimensions are length 25 feet, width 4 feet and a thickness of 3 inches. It is divided into a plurality of individual slabs *a* articulated by longitudinal reinforcing grid wires 20 (Fig. 2), each slab being also reinforced by transversely extending grid wires 21. A given number of these units may be connected together end to end to facilitate which said ends are preferably beveled as shown in Fig. 4 and provided with clip well recesses 22 across the outer edges of which the looped portions 20ª of grid wires 20 pass to form stirrups for end connecting elements. In the finished mat assembly the strings of units thus formed are united at their adjacent edges for which purpose there are provided in the ends of the slabs a clip well recesses 23 in which lie transverse portions or stirrups 21ª of grid wires 21. In the under sides of the edges of the unit there are provided longitudinally extending recesses 24 for the reception of the launching cables which are secured in place by clips inserted in clip wells formed by the complementary recesses 23 of adjacent unit mat sections.

Figure 3:
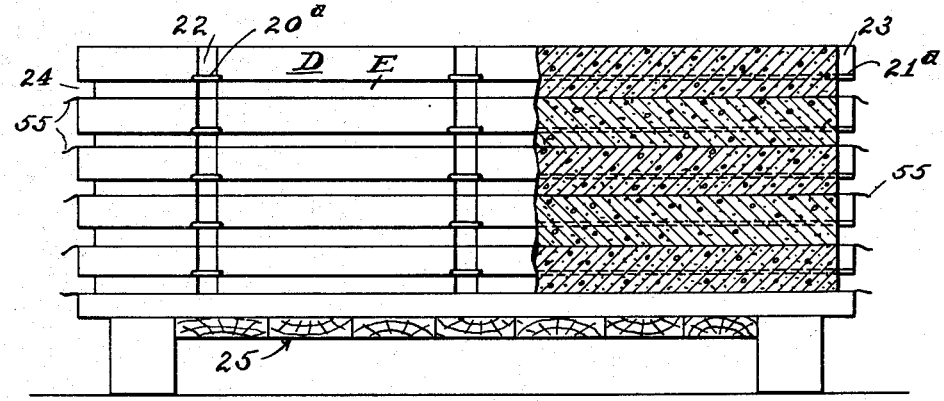
Figure 3 is a view of one end of a plurality of units partly in section, showing the manner in which successive units may be molded by the present forms one upon another.

The desired flexibility and continuity in the unit section I provide by positioning two sets of reinforcing wires forming a rectangular grid in a plane above the bottom face of the unit approximately ⅓ the thickness of the unit, with molding grooves at opposite sides of said wires separated by the longitudinal wires. These grooves are equally spaced to form the individual slabs a. They are in cooperating pairs preferably shaped as V's and inverted V's, the former, indicated as B (Fig. 4), are somewhat larger than the latter, indicated as C, particularly in order to make possible the removal of the form after the molding operation, inasmuch as the construction of the mold forms is such that successive units are molded one upon another in perfect registration both lengthwise and sidewise, as shown in Figs. 3 and 4. The tier thus formed is carried on a suitable pallet 25.

Referring now to Fig. 5 it will be seen that my mold form comprises a unit rectangular frame or flask preferably in segments. The top portion or cope of the flask comprises end unit segments each formed of an end bar 30 together with short pieces of the side rails 31 which carry one or more of the V-shaped cross pieces 32 for forming the similarly shaped grooves B (Fig. 1) separating the slabs a. The side rails of the cope are completed by intermediate segmental pieces 31ª which also carry the other remaining V-shaped cross pieces, indicated by 32ª. The inner face 30ª of the end bar 30 (Fig. 6) is preferably set at an angle, i. e. their top edges slope inwardly to form the upper beveled portion D (Fig. 4) of the end slabs of the unit, the inclination of which is the same as corresponding sides of the grooves B.

The nowel or drag portion of the mold flask, on which the cope is supported, is co-extensive with the cope segments and comprises the spaced side rail 35, the inner half portions of which extend within the cope side rails (Figs. 5 and 8) to form the cable channels 24 (Figs. 2 and 3) in the molded unit, and also to provide support for the molds along the sides of the casting base. Extending between and through these rails are the nowel end bars 36 the inner faces of which are preferably inclined inwardly from the top down, as indicated at 36ª to form the lower portion E of the end slabs of the cast unit.

The nowel side rails are segmental, corresponding to the length of the superimposed cope side rails. Extending between and through them are inverted V-shaped cross pieces 40 (Figs. 9 and 13) corresponding to the lower cross grooves C (Figs. 4 and 4ª) which define the lower edges of the slabs a.

While the cope is capable of removal by lifting each segment as a unit the nowel is constructed to be knocked down by segments to enable it to be removed after the molded unit has set or cured sufficiently to stand alone. To accomplish this the side pieces or rails 35 (Fig. 12) are provided at their ends with apertures which accommodate the extremities 36ᵇ of end pieces 36. Likewise the extremities 40ª of the intermediate cross pieces 40 pass through the side rails 35 and extend beyond them. As shown in Figs. 10 and 11 these extremities are made somewhat smaller than the bodies of the end pieces and cross pieces, thus forming end shoulders 36ᶜ and 40ᶜ which determine the accurate spacing apart of the side rails each time these parts are assembled. The extension of the end and cross pieces through and beyond the side pieces and shoulders thereon make possible the easy removal of the side pieces 35 from the casting laterally by simply driving in the ends of the cross pieces extending beyond the opposite side rail which at the same time also frees the cross pieces for withdrawal endwise.

The inwardly extending half portions of the nowel side pieces 35 in addition to supporting the form assembly on the preceding casting also serve to form the continuous underlying cable recesses 24 (Figs. 2 and 4) in the ends of the slabs and sides of the sections and also to support the ends of the transverse grid wires 21. The later are held in place by the inwardly extending form boxes or blocks 45 on the cope sides 31—31ª (Figs. 8 and 12). These boxes or blocks fit between the looped ends of said wires and are cut away, as indicated at 45ª, to accommodate the portions of the wires forming the stirrups 21ª.

The throughway slots or recesses 22 (Figs. 1, 2, 3) in the end slabs a of the unit mat section are formed by lower and upper box like projections 46 and 47 (Figs. 6 and 7) which are in vertical alinement and extend inwardly beyond the faces 36ª—30ª on the respective end pieces or bars of the nowel and cope. The ends of the longitudinal grid wires 20 rest on the lower boxes 46 and are held thereon by the upper boxes which are notched at 47ª to accommodate the ends of the wires which form the stirrups 20ª.

Registration of the mold form on a previously cast unit is assisted and its lateral displacement is prevented by providing on the underside of the nowel side rails 35 channel bars 50 (Fig. 8) which also serve as hand grips in removing the side pieces from the casting. In order to prevent leakage the flanged plates 51 are placed on the underside of the end pieces 36, the inner sides of which extend beyond the inclined faces 36ª (Fig. 6). At intermediate points on rails 35, directly below the apertures which accommodate the inverted V-shaped cross pieces 40 are other stops 52 (Figs. 8, 9 and 12) which fit into certain of the grooves B of the preceding casting and thus assure positive centering and registration therewith.

Registration and lateral interlocking of cope to nowel is effected by studs 53 (Figs. 8 and 12) on the nowel side pieces which pass freely through apertures provided in the corresponding parts of the cope.

The weight of the molding flask may be lightened by making certain of the parts, such as the side pieces 35 and cross pieces 32 and 40 hollow and others of structural sections as shown. The material is preferably aluminum, but wood, steel or any suitable plastic material may be employed.

"Draw" is provided in the form mold sides by a slight inclination inward of the top of side rail 31 and 31ª (Figs. 5 and 8) and a corresponding inward downward inclination of the top of side rail 35 (too small to show in the drawings). This facilitates drawing or freeing these parts from the casting without injury to the slab ends.

Figure 4A:
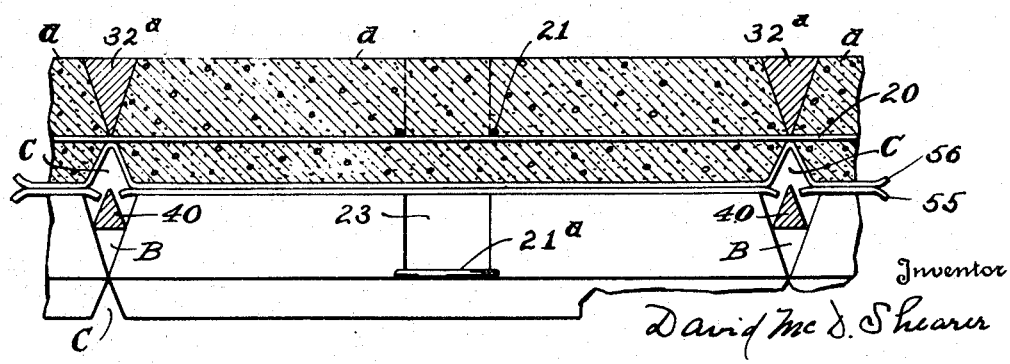

A further object of my invention resides in the method employed in assembling the flask on a precast unit mat section used as a casting base. Preliminary to doing this I preferably cover the completed base unit with a sheet of relatively thin but strong paper. The latter, indicated by 55 (Fig. 4a) may be coextensive with the area of said unit or it may overlap its ends and sides slightly. The assembled nowel is then laid over the paper which is held in place at its edges by the weight of the nowel and its cross pieces.

The second step is the positioning of a second layer of paper 56 which is the same in width as the space between the inner edges of the rails 35. This layer of paper may consist merely of a series of narrow strips, one laid over each nowel cross piece; or it may consist of a single long sheet spread loosely over the nowel cross pieces. Next, the wire grid is placed over the paper on the nowel. When prefabricated the grid is placed as a unit. When the grid parts are preformed and assembled in place in the forms the longitudinal members 20 are placed first, then the transverse members 40 laid over them.

One advantage of using the second sheet or its equivalent in strips is that it facilitates removal of the cross pieces 40; another is that it permits a lighter weight and consequently cheaper grade of paper to be used. A third and principal advantage is that it prevents the mortar of the concrete from flowing under the nowel cross pieces where it would become set and complicate their removal. It makes no difference that the paper may tear over the tops of the cross pieces when the concrete is poured, it still accomplishes its purpose. It also saves time and labor in cleaning adhering cement mortar from the cross pieces. The last step is to lower the unit cope in place over the nowel at the same time engaging the ends of the grid wires in their receptacles. Finally the interior of the assembled forms is sprayed or otherwise coated with light oil. The set up is now ready for receiving the concrete mixture.

It will be seen that by making the cross pieces 32 and 40 of unequal size and placing the larger one in the flask cope that the smaller cross pieces of the nowel are always directly above these larger openings in a preceding casting. Hence, when the flask is disassembled these smaller cross pieces may be readily removed through the underlying paper, when it is used, or when it is not used, by merely dropping them individually into the corresponding underlying grooves B of the base casting, whence they may be readily removed endwise from between the two castings.

I have set forth hereinabove a unit form mold structure of which, in my novel revetment mat construction, several duplicate molds will be employed to speed the work, the parts of which are interchangeable, each of which is capable of molding duplicate unit mat sections, within allowable tolerances, whereby continuous casting operations may be carried on by building up a series of tiers of mat section units, the only delays suffered being the time required for the cement to set.

I claim:

1. The art of manufacturing unit sections of revetment mats consisting in first casting a unit section in a mold flask comprising a nowel and cope each having said rails, end pieces and cross pieces, said parts of the nowel being demountable, disengaging the flask from casting when it becomes set, placing a sheet of paper over said casting, subsequently remounting the nowel in assembled form on said precasting, placing a second sheet of paper over the first mentioned sheet and over the nowel cross pieces, placing the cope on the nowel and filling the flask with concrete.

2. The art of manufacturing unit sections of revetment mats consisting in first casting a unit section in a mold flask comprising a nowel and a cope, each having side rails, end pieces and cross pieces of V-shaped cross section, said parts of the nowel being demountable, disengaging the flask parts when the casting has become set, spreading a sheet of paper over the set casting, reassembling the nowel on said precasting, placing a second sheet of paper over the first and over the nowel cross pieces, placing the cope on the nowel and filling the flask with concrete.

3. The art of manufacturing unit sections of revetment mats consisting in first casting a unit section in a mold flask comprising a nowel and cope each having side pieces, end pieces and cross pieces, said parts of the nowel being demountable, disengaging the flask from the casting when it becomes set, subsequently remounting the nowel in assembled form on said precasting, spreading a sheet of paper over the nowel, placing the cope on the nowel and filling the flask with concrete.

4. The art of manufacturing unit sections of revetment mats consisting in first casting a unit section in a mold flask comprising a nowel and a cope each having side pieces, end pieces and cross pieces of triangular cross section, said parts of the nowel being demountable, disengaging the flask from the casting when the latter has sufficiently set, reassembling the nowel on said precasting, spreading a sheet of paper over the nowel cross pieces, placing the cope on the nowel and filling the flask with concrete.

DAVID McD. SHEARER.

REFERENCES CITED

The following references are of record in the file of this patent:

UNITED STATES PATENTS

| Number | Name | Date |
|---|---|---|
| 1,457,999 | Pedersen | June 5, 1923 |
| 1,592,591 | Amele | July 13, 1926 |
| 1,830,225 | Dance | Nov. 3, 1931 |
| 2,306,107 | Henderson | Dec. 22, 1942 |